US012592243B2

(12) United States Patent
Gudepu et al.

(10) Patent No.: US 12,592,243 B2
(45) Date of Patent: Mar. 31, 2026

(54) METHOD AND ELECTRONIC DEVICE FOR PERSONALIZED AUDIO ENHANCEMENT

(71) Applicant: SAMSUNG ELECTRONICS CO., LTD., Suwon-si (KR)

(72) Inventors: Prithvi Raj Reddy Gudepu, Bengaluru (IN); Nitya Tiwari, Bengaluru (IN); Sandip Shriram Bapat, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 213 days.

(21) Appl. No.: 18/302,683

(22) Filed: Apr. 18, 2023

(65) Prior Publication Data

US 2023/0260526 A1 Aug. 17, 2023

Related U.S. Application Data

(63) Continuation of application No. PCT/KR2022/014249, filed on Sep. 23, 2022.

(30) Foreign Application Priority Data

Sep. 24, 2021 (IN) ............................ 202141043508
Sep. 5, 2022 (IN) ............................ 202141043508

(51) Int. Cl.
*G10L 21/02* (2013.01)
*G10L 21/10* (2013.01)

(52) U.S. Cl.
CPC .............. *G10L 21/02* (2013.01); *G10L 21/10* (2013.01)

(58) Field of Classification Search
CPC ..... G10L 21/02; H04R 25/356; H04R 25/507; H04R 25/70; H04R 2205/041; H04R 2225/41; H04R 2225/43
See application file for complete search history.

(56) References Cited

U.S. PATENT DOCUMENTS 6,876,750 B2 4/2005 Allred et al.
7,529,545 B2 5/2009 Rader et al.
(Continued)

FOREIGN PATENT DOCUMENTS

KR 20120131778 A 12/2012
KR 20160129752 A 11/2016
(Continued)

OTHER PUBLICATIONS

Extended European Search Report dated May 3, 2024 issued in European Patent Application No. 22873203.8.
(Continued)

*Primary Examiner* — Daniel C Washburn
*Assistant Examiner* — Penny L Caudle
(74) *Attorney, Agent, or Firm* — Nixon & Vanderhye, P.C.

(57) ABSTRACT

Embodiments herein disclose a method and electronic device for personalized audio enhancement. The method includes: receiving, by the electronic device, a plurality of inputs, in response to an audiogram test. The method includes generating, by the electronic device, a first audiogram representative of a first personalized audio setting to suit a first ambient context, based on the received inputs. The method also includes determining a change from the first ambient context to a second ambient context for an audio playback, analyzing a plurality of contextual parameters during the audio playback in the second ambient context, and generating a second audiogram representative of a second personalised audio setting to suit the second ambient context based on the analysis of the plurality of contextual parameters, by the electronic device.

12 Claims, 11 Drawing Sheets

(56) References Cited

U.S. PATENT DOCUMENTS

| | | | | |
|---|---|---|---|---|
| 9,008,340 | B2 | 4/2015 | Ku et al. | |
| 10,345,901 | B2 | 7/2019 | Hwang et al. | |
| 10,734,964 | B2 | 8/2020 | Shin | |
| 11,005,439 | B2 | 5/2021 | Li et al. | |
| 11,134,353 | B2 | 9/2021 | Pye et al. | |
| 2003/0063763 | A1 | 4/2003 | Allred et al. | |
| 2005/0260978 | A1 | 11/2005 | Rader et al. | |
| 2006/0198530 | A1 | 9/2006 | Fischer et al. | |
| 2014/0119583 | A1 | 5/2014 | Valentine et al. | |
| 2014/0211972 | A1 | 7/2014 | Kim et al. | |
| 2014/0307900 | A1 | 10/2014 | Choi et al. | |
| 2016/0149547 | A1 | 5/2016 | Rider et al. | |
| 2016/0173999 | A1 | 6/2016 | Ungstrup et al. | |
| 2016/0234606 | A1* | 8/2016 | Selig | A61B 5/6898 |
| 2020/0221240 | A1 | 7/2020 | Pye et al. | |
| 2020/0382859 | A1 | 12/2020 | Woodruff et al. | |
| 2021/0152933 | A1 | 5/2021 | Boley et al. | |

FOREIGN PATENT DOCUMENTS

| | | |
|---|---|---|
| KR | 101941680 B1 | 1/2019 |
| KR | 10-2020-0078184 | 7/2020 |
| KR | 10-2020-0085226 | 7/2020 |
| WO | 2021/178101 | 9/2021 |

OTHER PUBLICATIONS

Indian Examination Report issued Aug. 16, 2023 in corresponding Indian Patent Application No. 202141043508.

International Search Report for PCT/KR2022/014249 mailed Jan. 20, 2023, 3 pages.

Written Opinion of the ISA for PCT/KR2022/014249 mailed Jan. 20, 2023, 4 pages.

Hearing Notice dated Apr. 17, 2025 in Indian Patent Application No. 202141043508.

Examination Report issued Jan. 5, 2026 in European Patent Application No. 22873203.8.

* cited by examiner

METHOD AND ELECTRONIC DEVICE FOR PERSONALIZED AUDIO ENHANCEMENT

CROSS-REFERENCE TO RELATED APPLICATIONS

This application is a continuation of International Application No. PCT/KR2022/014249 designating the United States, filed on Sep. 23, 2022, in the Korean Intellectual Patent Office, and to Indian Provisional Patent Application No. 202141043508, filed on Sep. 24, 2021 and Indian Complete Patent Application No. 202141043508, filed on Sep. 5, 2022, in the Indian Patent Office, the disclosures of all of which are incorporated by reference herein in their entireties.

FIELD

Background

The disclosure relates to electronic devices, and for example to a method and an electronic device for personalized audio enhancement with high robustness towards an audio context.

Description of Related Art

In general, an audio enhancement is performed to modify and enhance music and audio played through an electronic device such as for example, but not limited to speakers, headphones, etc., to provide a better sound experience to a user. The audio is enhanced by removing background noise, where the background noise disappears in seconds, automatically. Conventionally, audio enhancement is performed by making changes in basic audio volume and equalizer settings based on an output of a machine learning (ML) model. The ML model obtains user's metadata comprising history of user audio playback like listening volume, and contextual parameters such as location, time, noise, etc., as input to enhance the audio. The ML model is learned based on user's controls on audio playback and provides the right amount of volume settings to enhance the audio.

Further, the conventional methods and systems perform audiometric compensation based on an audiogram which tests the hearing capability of the user across frequencies. A predefined model is used to estimate the amount of gain the audio needs, by deriving the contextual parameters such as audiometric environmental noise factors, and the compression function as input. In conventional methods and systems, the volume of the electronic device can be appropriately adjusted by comprehensively considering the intensity of the external environmental noise and the position information and/or the motion status of the user.

However, the ML model used in the conventional methods and systems are static and does not learn with time. The conventional methods and system does not perform audio processing on frequency level for robust enhancement, and do not cover hearing loss impairments. For example, if a person has trouble with hearing some of the high frequencies in a crowded environment with noisy background, the system simply amplifies all the higher frequencies which lead to improve certain frequencies by degrading others. Therefore, the system does not achieve a direct fine grained control by frequency level amplification specific to each of the multiple environmental scenarios determined by the parameters.

Thus, there is a need to enhance the audio playback experience of the user by continuous personalization of frequency based gain adjustments for different user contexts. It is desired to address the above mentioned disadvantages or other shortcomings or at least provide a useful alternative.

SUMMARY

Embodiments of the disclosure provide a method and an electronic device for personalized audio enhancement with high robustness towards an audio context. The method includes generating, by the electronic device, a first audiogram representative of a first personalized audio setting to suit a first ambient context of a user, based on inputs received from the user.

Embodiments of the disclosure may determine a change from a first ambient context to a second ambient context for an audio playback directed to the user.

Embodiments of the disclosure may analyze a plurality of contextual parameters such as for example but not limited to an audio context, a noise context, a signal-to-noise ratio, an echo, a voice activity, a scene classification, a reverberation and a user input during the audio playback in the second ambient context.

Embodiments of the disclosure may generate a second audiogram representative of a second personalised audio setting to suit a second ambient context based on the analysis of the plurality of contextual parameters.

Embodiments of the disclosure achieve a direct fine-grained amplification control at each frequency in each type of audio environment, using the plurality of contextual parameters in audiometric compensation function. The compensation function itself is learned with time using the user inputs to control the audio playback settings such as for example but not limited to volume control, equalizer settings, normal/ambient sound/active noise cancellation mode, etc., and makes the system heavily personalized to the user at different frequency levels. Thereby, enhancing the audio playback experience of the user in real time by personalizing frequency based gain settings for different user contexts, and making the process user friendly.

Accordingly various example embodiments herein disclose a method for personalized audio enhancement using an electronic device. The method includes: receiving, by the electronic device, a plurality of inputs, in response to an audiogram test; generating, by the electronic device, a first audiogram representative of a first personalized audio setting to suit a first ambient context, based on the received inputs; determining, by the electronic device, a change from the first ambient context to a second ambient context for an audio playback dir; analyzing a plurality of contextual parameters during the audio playback in the second ambient context, and generating a second audiogram representative of a second personalised audio setting to suit the second ambient context based on the analysis of the plurality of contextual parameters, by the electronic device.

In an example embodiment, the first audiogram includes first frequency based gain settings for audio playback across each of the different audio frequencies in the first ambient context.

In an example embodiment, the second audiogram includes second frequency based gain settings for audio playback across each of the different audio frequencies in the second ambient context.

In an example embodiment, the first audiogram corresponds to a one-dimensional frequency-based compression function, and the second audiogram corresponds to a multi-dimensional frequency-based compression function.

In an example embodiment, the change from the first ambient context to the second ambient context is determined, by monitoring a plurality of audio signals with different audio frequencies played back in different ambient conditions.

In an example embodiment, the contextual parameters includes at least one of an audio context, a noise context, a signal-to-noise ratio, an echo, a voice activity, a scene classification, a reverberation and an input during the audio playback in the second ambient context.

Accordingly various example embodiments herein disclose an electronic device for personalized audio enhancement. The electronic device includes: a memory, a processor coupled to the memory, a communicator comprising communication circuitry coupled to the memory and the processor, and a contextual compression function management controller comprising circuitry coupled to the memory, the processor and the communicator. The contextual compression function management controller is configured to: receive a plurality of inputs, in response to an audiogram test; generate a first audiogram representative of a first personalized audio setting to suit a first ambient context, based on the received inputs; determine a change from the first ambient context to a second ambient context for an audio playback; analyze a plurality of contextual parameters during the audio playback in the second ambient context; and generate a second audiogram representative of a second personalised audio setting to suit the second ambient context based on the analysis of the plurality of contextual parameters.

Accordingly various example embodiments herein disclose a method for personalized audio enhancement using the electronic device. The method includes: receiving, by the electronic device, a plurality of inputs, in response to an audiogram test; generating, by the electronic device, a first hearing perception profile using the received one or more inputs; monitoring over time, by the electronic device, the audio playback across different audio frequencies in different ambient conditions; analyzing one or more contextual parameters during the audio playback across different frequencies during different ambient conditions; and generating a second hearing perception profile using the one or more contextual parameters, by the electronic device.

In an example embodiment, the first hearing perception profile includes a first frequency based gain settings for audio playback across different audio frequencies, and the second hearing perception profile includes a second frequency based gain settings for audio playback across each of the different audio frequencies.

In an example embodiment, the first hearing perception profile corresponds to a first audiogram, and the second hearing perception profile corresponds to a second audiogram.

In an example embodiment, the second frequency based gain settings for audio playback are different from the first frequency based gain settings across different frequencies.

In an example embodiment, the contextual parameters include at least one of the audio context, the noise context, the signal-to-noise ratio, the echo, the voice activity, the scene classification, the reverberation and the user input during the audio playback during different ambient conditions.

Accordingly various example embodiments herein disclose an electronic device for personalized audio enhancement. The electronic device: a memory, a processor coupled to the memory, a communicator comprising communication circuitry coupled to the memory and the processor, and a contextual compression function management controller comprising coupled to the memory, the processor and the communicator. The contextual compression function management controller is configured to: receive a plurality of inputs f, in response to an audiogram test; generate a first hearing perception profile using the received one or more inputs; monitor over time an audio playback across different audio frequencies in different ambient conditions; analyze one or more contextual parameters during the audio playback across different frequencies in different ambient conditions; and generate a second hearing perception profile using the one or more contextual parameters.

These and other aspects of the various example embodiments herein will be better appreciated and understood when considered in conjunction with the following description and the accompanying drawings. It should be understood, however, that the following descriptions, while indicating various example embodiments and numerous specific details thereof, are given by way of illustration and not of limitation. Many changes and modifications may be made within the scope of the embodiments herein without departing from the disclosure, and the embodiments herein include all such modifications.

BRIEF DESCRIPTION OF THE DRAWINGS

The disclosure is illustrated in the accompanying drawings, throughout which like reference letters indicate corresponding parts in the various figures. Further, the above and other aspects, features and advantages of certain embodiments of the present disclosure will be more apparent from the following detailed description, taken in conjunction with the accompanying drawings, in which.

DETAILED DESCRIPTION

Figure 1:
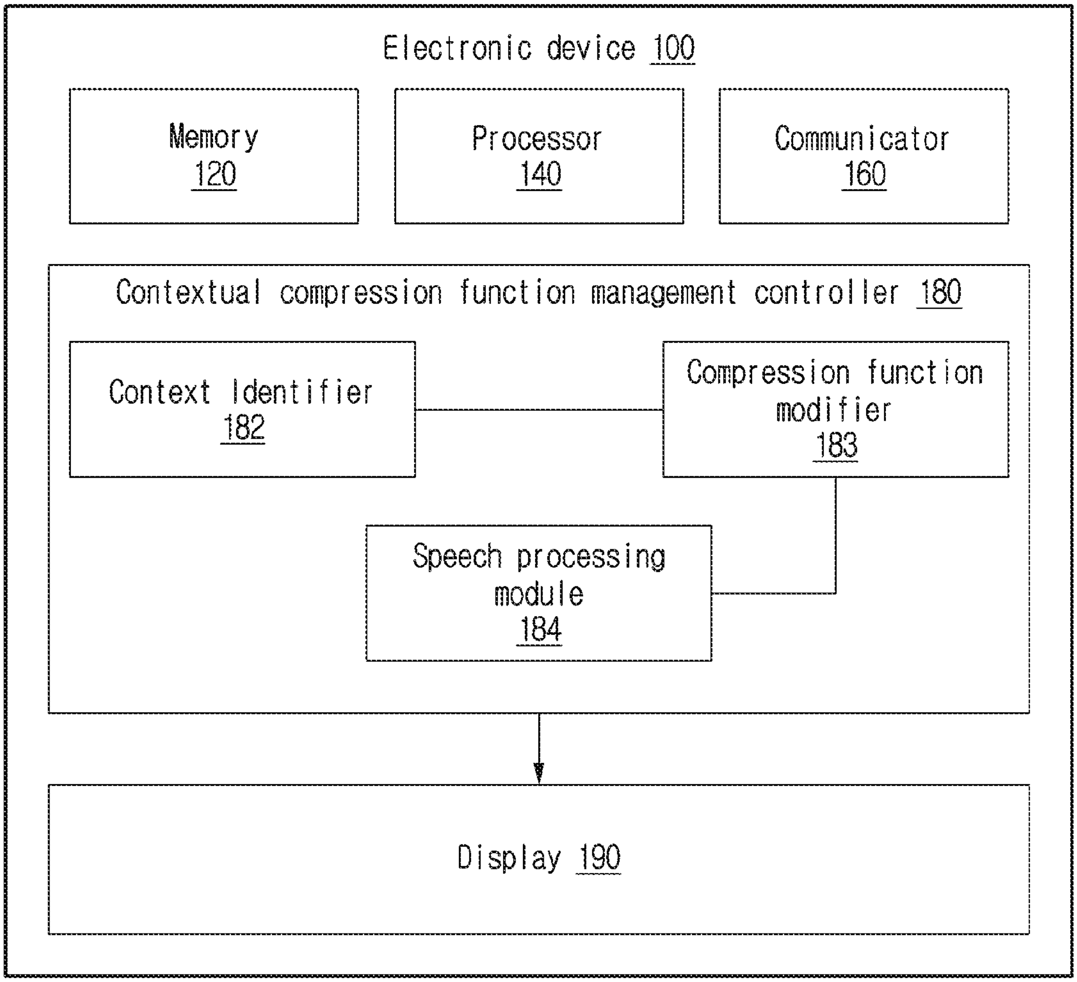
FIG. 1 is a block diagram illustrating an example configuration of an electronic device for personalized audio enhancement, according to various embodiments.

The various example embodiments herein and the various features and advantageous details thereof are explained more fully with reference to the non-limiting example embodiments that are illustrated in the accompanying drawings and detailed in the following description. Descriptions of well-known components and processing techniques may omitted so as to not unnecessarily obscure the embodiments herein. The various embodiments described herein are not necessarily mutually exclusive, as various embodiments can be combined with one or more embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Various embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits of a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to aid in understanding various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly various example embodiments herein disclose a method for personalized audio enhancement using an electronic device. The method includes receiving, by the electronic device, a plurality of inputs from a user of the electronic device, in response to an audiogram test provided to the user. The method includes generating, by the electronic device, a first audiogram representative of a first personalized audio setting to suit a first ambient context of the user, based on the inputs received from the user. The method also includes determining, by the electronic device, a change from the first ambient context to a second ambient context for an audio playback directed to the user. Further, the method includes analyzing a plurality of contextual parameters during the audio playback in the second ambient context, and generating a second audiogram representative of a second personalised audio setting to suit the second ambient context based on the analysis of the plurality of contextual parameters, by the electronic device.

Accordingly various example embodiments herein disclose an electronic device for personalized audio enhancement. The electronic device includes a memory, a processor coupled to the memory, a communicator (e.g., including communication circuitry) coupled to the memory and the processor, and a contextual compression function management controller (e.g., including various processing and/or control circuitry and/or executable program instructions) coupled to the memory, the processor and the communicator. The contextual compression function management controller is configured to receive a plurality of inputs from a user of the electronic device, in response to an audiogram test provided to the user; generate a first audiogram representative of a first personalized audio setting to suit a first ambient context of the user, based on the inputs received from the user; determine a change from the first ambient context to a second ambient context for an audio playback directed to the user; analyze a plurality of contextual parameters during the audio playback in the second ambient context; and generate a second audiogram representative of a second personalised audio setting to suit the second ambient context based on the analysis of the plurality of contextual parameters.

Accordingly various example embodiments herein disclose a method for personalized audio enhancement using the electronic device. The method includes receiving, by the electronic device, a plurality of inputs from a user of the electronic device, in response to an audiogram test provided to the user. The method includes generating, by the electronic device, a first hearing perception profile of the user using the received one or more user inputs. The method also includes monitoring over time, by the electronic device, the audio playback directed to the user across different audio frequencies in different ambient conditions. Further, the method includes analyzing one or more contextual parameters during the audio playback directed to the user across different frequencies during different ambient conditions; and generating a second hearing perception profile of the user using the one or more contextual parameters, by the electronic device.

Accordingly various example embodiments herein disclose the electronic device for personalized audio enhancement. The electronic device includes the memory, the processor coupled to the memory, the communicator coupled to the memory and the processor, and the contextual compression function management controller coupled to the memory, the processor and the communicator. The contextual compression function management controller is configured to receive a plurality of inputs from the user of the electronic device, in response to the audiogram test provided to the user; generate a first hearing perception profile of the user using the received one or more user inputs; monitor over time an audio playback directed to the user across different audio frequencies in different ambient conditions; analyze one or more contextual parameters during the audio playback directed to the user across different frequencies in different ambient conditions; and generate a second hearing perception profile of the user using the one or more contextual parameters.

Conventional methods and system provide a mechanism for automated audio adjustment. A processing system for automated audio adjustment include a monitoring module to obtain contextual data of a listening environment; a user profile module to access a user profile of a listener; and an audio module to adjust an audio output characteristic based on the contextual data and the user profile, the audio output characteristic to be used in a media performance on a media playback device. More particularly, the system monitors the background noise levels, location, time, context of listening, presence of other people, identification or other characteristics of the listener for audio adjustment. A separate model is learned by inputting the user profile itself and the contextual information. Audio processing is performed by controlling the audio volume and equalizer settings.

Conventional methods and system provide sound enhancement for mobile phones and other products which produce audio for users, and enhances sound based on an individual's hearing profile, the environmental factors like noise-induced hearing impairment, and based on personal choice. The system includes resources applying measures of an individual's hearing profile, personal choice profile, and induced hearing loss profile, separately or in combination, to build the basis of sound enhancement. A personal communication device comprises a transmitter/receiver coupled to a communication medium for transmitted receiving audio signals, control circuitry to control transmission, reception and processing of call and audio signals, a speaker, and a microphone. The control circuitry includes logic applying one or more of the hearing profile of the user, a user preference related hearing, and environmental noise factors in processing the audio signals.

Unlike to the conventional methods and systems, in the disclosed method, the contextual parameters such as, for example, but not limited to, the audio context, the noise context, the signal-to-noise ratio, the echo, the voice activity, the scene classification, the reverberation and the user input during the audio playback during different ambient conditions are used in the compression function to provide a direct fine grained control by frequency level amplification specific to each of the multiple environmental scenarios determined by the parameters. The disclosed method trains a Machine Learning (ML) model separate from the compression function to moderate the personalization capability, while the contextual compression function itself is learned with time according to the user habits, using the user inputs to control audio playback settings such as for example but not limited to volume control, equalizer settings, normal/ambient sound/active noise cancellation mode, etc. Thereby, making the device heavily personalized to the user at different frequency levels. Therefore, the audio playback experience of the user is enhanced by personalizing frequency based gain setting for different user contexts. Further, the disclosed method improves the listening experience of the user for media playback, phone calls and live conversations with different level of enhancements across wide range of environments, even for people with hearing disability.

Referring now to the drawings and more particularly to FIGS. 1 through 11, where similar reference characters denote corresponding features consistently throughout the figures, these are shown various example embodiments.

FIG. 1 is a block diagram illustrating an example configuration of an electronic device (100) for personalized audio enhancement, according to various embodiments. Referring to FIG. 1, the electronic device (100) may be, but is not limited to, a digital earpiece such as for example an earbuds, an earphone, a headphone, etc., a laptop, a palmtop, a desktop, a mobile phone, a smart phone, Personal Digital Assistant (PDA), a tablet, a wearable device, an Internet of Things (IoT) device, a virtual reality device, a foldable device, a flexible device, a display device and an immersive system.

In an embodiment, the electronic device (100) includes a memory (120), a processor (e.g., including processing circuitry) (140), a communicator (e.g., including communication circuitry) (160), a contextual compression function management controller (e.g., including various processing and/or control circuitry and/or executable program instructions) (180) and a display (190).

The memory (120) is configured to store instructions to be executed by the processor (140). The memory (120) can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) is configured to store larger amounts of information. In certain examples, a non-transitory storage medium may store data that can, over time, change (e.g., in Random Access Memory (RAM) or cache).

The processor (140) may include various processing circuitry, including, for example, one or a plurality of processors. The one or the plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The processor (140) may include multiple cores and is configured to execute the instructions stored in the memory (120).

In an embodiment, the communicator (160) includes an electronic circuit specific to a standard that enables wired or wireless communication. The communicator (160) is configured to communicate internally between internal hardware components of the electronic device (100) and with external devices via one or more networks.

In an embodiment, the contextual compression function management controller (180) may include various processing and/or control circuitry and/or executable program instructions, and includes a context identifier (182), a compression function modifier (183) and a speech processing module (184).

In an embodiment, the context identifier (182) of the contextual compression function management controller (180) is configured to receive a plurality of inputs from the user of the electronic device (100), in response to an audiogram test provided to the user. The audiogram test is performed to test the user's ability to hear sounds. The user undergoes a one-time audiometric test and the resultant audiogram is used to generate an initial compression function based on the user inputs during the audiogram test. The compression function is used to reduce the dynamic range of signals with the loud and quiet sounds so that both the loud and quiet sounds can be heard clearly. The context identifier (182) is configured to identify one or more contextual parameters during audio playback in different ambient conditions. The contextual parameters include but not limited to the audio context such as for example but not limited to the audio of music, the audio of news, etc., the noise context such as for example but not limited to murmuring sound, background noise, etc., the signal-to-noise ratio that compares the level of a desired signal to the level of background noise, the echo such as for example but not limited to the repetition of the sound created by footsteps in an empty hall, the sound produced by the walls of an enclosed room, etc., and the user input during the audio playback.

In an embodiment, a compression function modifier (183) is configured to modify the initial compression function to generate a contextual compression function, based on the contextual parameters identified during the audio playback in different ambient conditions.

In an embodiment, the speech processing module (184) is configured to transform the signals based on the ambient conditions, and enhance the audio using the contextual parameters.

The contextual compression function management controller (180) may be implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

At least one of the plurality of modules/components of the contextual compression function management controller (180) may be implemented through an AI model. A function associated with the AI model may be performed through memory (120) and the processor (140). The one or a plurality of processors controls the processing of the input data in accordance with a predefined (e.g., specified) operating rule or the AI model stored in the non-volatile memory and the volatile memory. The predefined operating rule or artificial intelligence model is provided through training or learning.

Here, being provided through learning may refer, for example, to, by applying a learning process to a plurality of learning data, a predefined operating rule or AI model of a desired characteristic being made. The learning may be performed in a device itself in which AI according to an embodiment is performed, and/or may be implemented through a separate server/system.

The AI model may include a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning process may refer, for example, to a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

In an embodiment, the display (190) is configured to provide the resultant audiogram used to generate the initial compression function based on the user inputs during the audiogram test. The display (190) is implemented using touch sensitive technology and comprises one of liquid crystal display (LCD), light emitting diode (LED), etc.

Although FIG. 1 illustrates various hardware elements of the electronic device (100) it is to be understood that various embodiments are not limited thereon. In various embodiments, the electronic device (100) may include less or more number of elements. Further, the labels or names of the elements are used only for illustrative purpose and does not limit the scope of the disclosure. One or more components can be combined together to perform same or substantially similar function.

Figure 2:
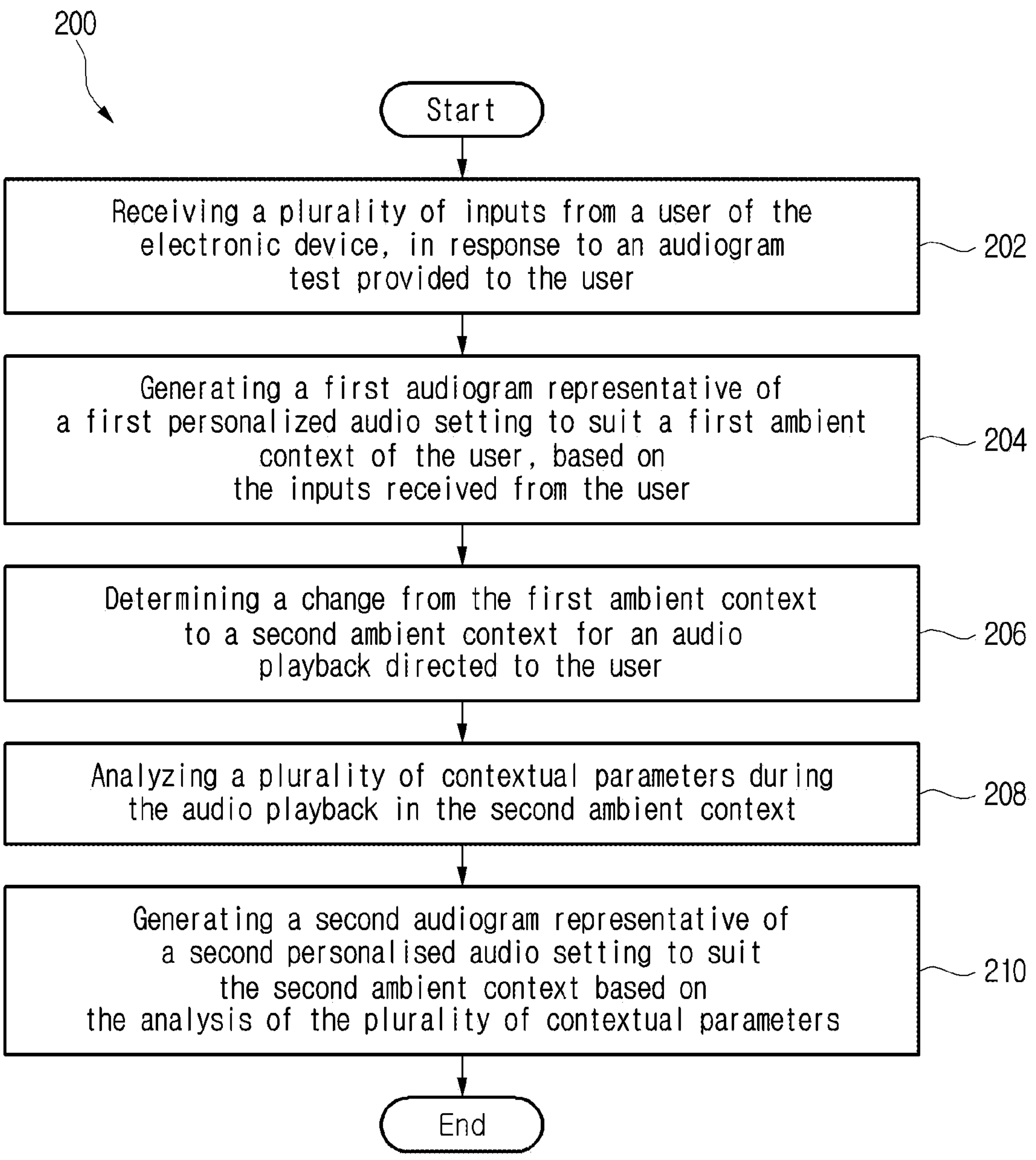
FIG. 2 is a flowchart illustrating an example method for the personalized audio enhancement by the electronic device, according to various embodiments.

FIG. 2 is a flowchart (200) illustrating an example method for the personalized audio enhancement using the electronic device (100), according to various embodiments.

Referring to FIG. 2, at 202, the method includes the electronic device (100) receiving the plurality of inputs from the user of the electronic device (100), in response to the audiogram test provided to the user. For example, in the electronic device (100) as illustrated in FIG. 1, the contextual compression function management controller (180) is configured to receive the plurality of inputs from the user of the electronic device (100), in response to the audiogram test provided to the user.

At 204, the method includes the electronic device (100) generating the first audiogram representative of a first personalized audio setting to suit the first ambient context of the user, based on the inputs received from the user. For example, in the electronic device (100) as illustrated in FIG. 1, the contextual compression function management controller (180) is configured to generate the first audiogram representative of the first personalized audio setting to suit the first ambient context of the user, based on the inputs received from the user. The first audiogram corresponds to the one-dimensional frequency-based compression function. The first ambient context is a context in which the user has performed the audiogram test. The first audiogram of the user includes first frequency based gain settings for audio playback across each of the different audio frequencies in the first ambient context.

At 206, the method includes the electronic device (100) determining a change from the first ambient context to the second ambient context for an audio playback directed to the user. For example, in the electronic device (100) as illustrated in FIG. 1, the contextual compression function management controller (180) is configured to determine the change from the first ambient context to the second ambient context for the audio playback directed to the user. The second ambient context is the context in which the user is listening to the audio playback. The second ambient context includes but not limited to different locations, different noise conditions, different ambient conditions, repetition of sounds, or combination of all the parameters.

The change from the first ambient context to the second ambient context is determined, by monitoring a plurality of audio signals with different audio frequencies played back by the user in different ambient conditions associated with the user.

At 208, the method includes the electronic device (100) analyzing a plurality of contextual parameters during the audio playback in the second ambient context. For example, in the electronic device (100) as illustrated in FIG. 1, the contextual compression function management controller (180) is configured to analyze a plurality of contextual parameters during the audio playback in the second ambient context.

At 210, the method includes the electronic device (100) generating the second audiogram representative of a second personalised audio setting to suit the second ambient context based on the analysis of the plurality of contextual parameters. For example, in the electronic device (100) as illustrated in FIG. 1, the contextual compression function management controller (180) is configured to generate the second audiogram representative of the second personalised audio setting to suit the second ambient context based on the analysis of the plurality of contextual parameters. The second audiogram corresponds to the multi-dimensional frequency-based compression function with contextual parameters as a part of the compression function inputs. The second audiogram of the user includes second frequency based gain settings for audio playback across each of the different audio frequencies in the second ambient context.

The various actions, acts, blocks, steps, or the like in the method may be performed in the order presented, in a different order or simultaneously. Further, in various embodiments, some of the actions, acts, blocks, steps, or the like may be omitted, added, modified, skipped, or the like without departing from the scope of the disclosure.

Figure 3:
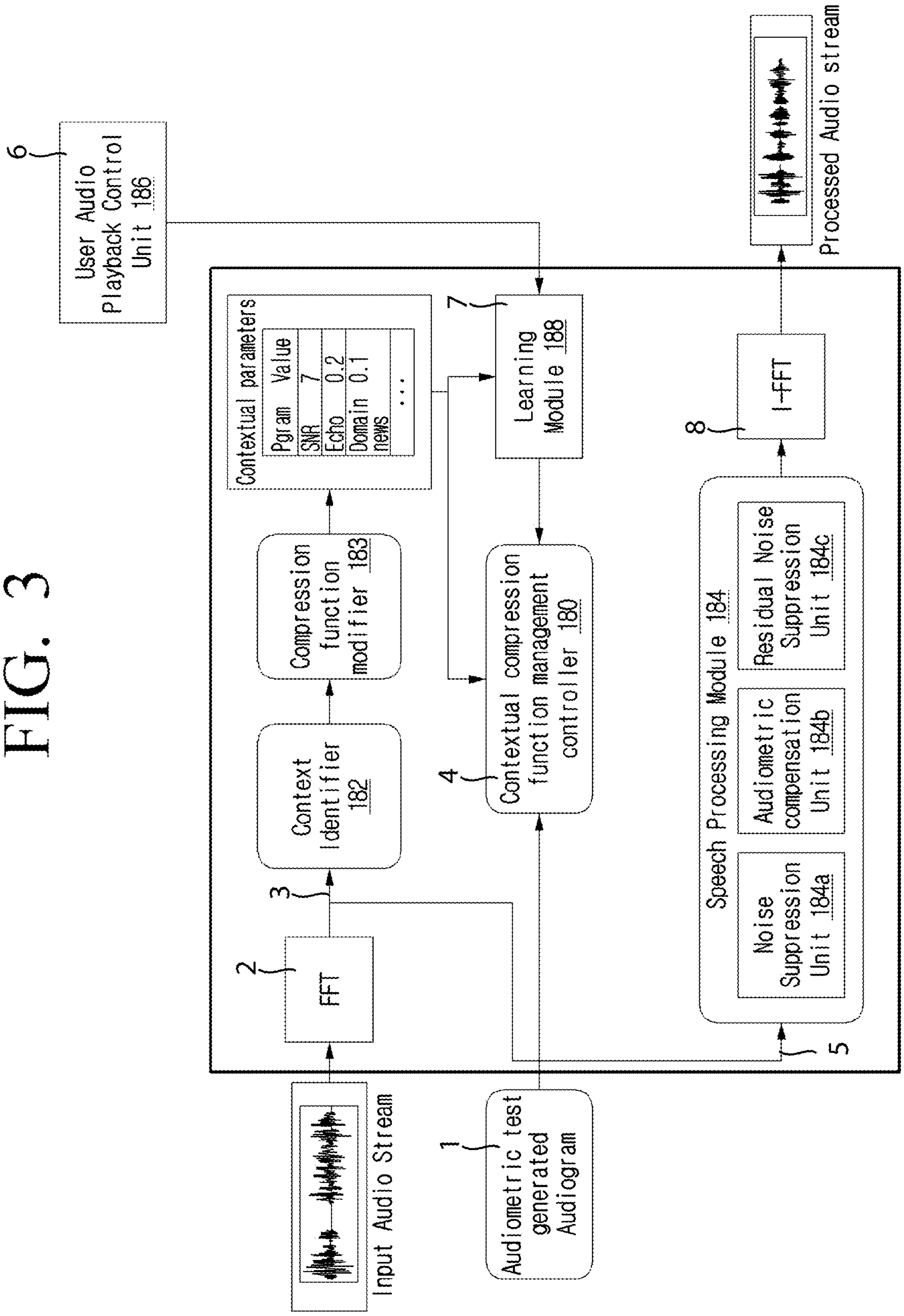
FIG. 3 is a block diagram illustrating an example configuration of a contextual compression function management controller of the electronic device, according to various embodiments.

FIG. 3 is a block diagram illustrating an example configuration of the contextual compression function management controller (180) of the electronic device (100), according to various embodiments.

The contextual compression function management controller (180) of the electronic device (100) includes the context identifier (182), the compression function modifier (183), the speech processing module (184), a user audio playback control unit (e.g., including various circuitry) (186) and a learning module (188) e.g. Machine Learning (ML) model. The speech processing module (184) includes a noise suppression unit (184*a*), an audiometric compensation unit (184*b*) and a residual noise suppression unit (184*c*). Each of the various modules and/or units listed above may include various circuitry (e.g., processing circuitry) and/or executable program instructions.

At 1, the user undergoes the one-time audiometric test and the resultant audiogram is used to generate the initial compression function based on the user inputs during the audiogram test. The audiometric test is performed to obtain a hearing perception level of the user, because each person has different hearing perception levels across the frequencies. At 2, each audio frame input by the user is converted to frequency domain using Fast Fourier Transfer (FFT). At 3, the converted frequency domain is input into the context identifier (182). The context identifier (182) is configured to identify one or more contextual parameters from the converted frequency domain, and each contextual parameter is given a value. The initial compression function is modified to generate the contextual compression function using the compression function modifier (183), based on the contextual parameters identified during the audio playback in different ambient conditions. At 4, the contextual compression function management controller (180) is configured to calculate the gain that needs to be applied at each frequency using the contextual parameters values, where the gain is the amount of amplification applied for each frequency. The gain for the required frequency is only applied or updated based on the user context, and the gains for the other frequencies will be maintained same.

At 5, the frequency domain is input into the speech processing module (184). The noise suppression unit (184*a*) of the speech processing module (184) is configured to suppress or reduce the background noise during different ambient conditions. The audiometric compensation unit (184*b*) is configured to balance the frequencies of the audio that vary based on the intensity and the speed of the tone. The residual noise suppression unit (184*c*) is configured to suppress the residual noise from the audio during different ambient conditions. Using the calculated gain values, the speech processing module (184) is configured to transform the frequency domain and enhance the audio across different audio frequencies in different ambient conditions. At 6, the user audio playback control unit (186) is configured to control the audio playback settings such as for example but not limited to volume control, equalizer settings, normal/ambient sound/active noise cancellation mode, etc., using the user inputs, which makes the device heavily personalized to the user's hearing capacity and habits at frequency level. At 7, the learning module (188) takes the user audio playback settings and the contextual parameters, and updates the contextual compression function continuously. At 8, the transformed frequency domain is converted back to time domain using an Inverse-FFT to output the enhanced audio personalized to the user's hearing capacity and habits at frequency level.

Figure 4:
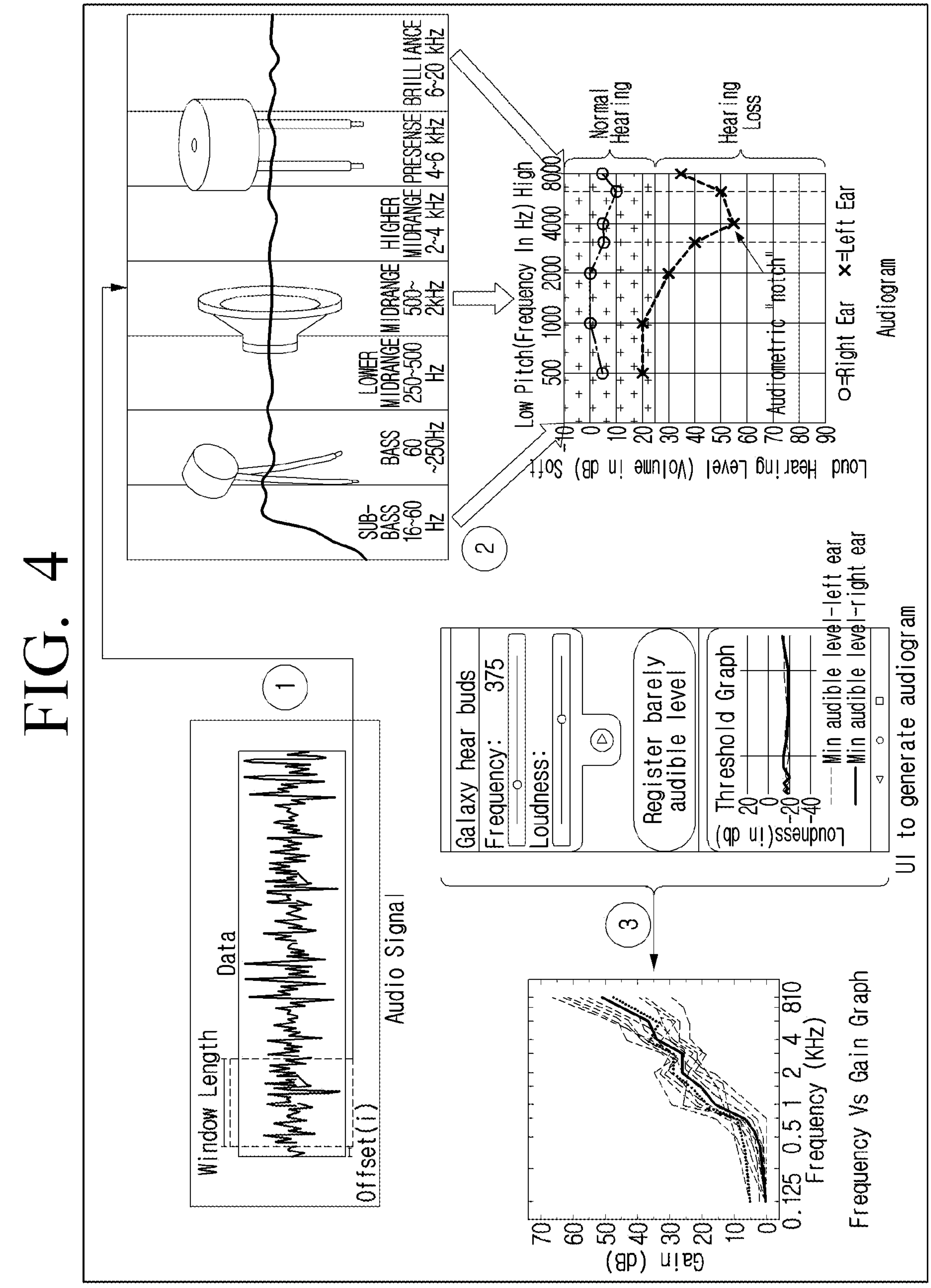
FIG. 4 is a diagram illustrating an example audio signal enhancement process, according to various embodiments.

FIG. 4 is a diagram illustrating an example audio signal enhancement process, according to various embodiments.

Referring to FIG. 4, the audio signal enhancement process is performed by: Operation 1, receiving a plurality of inputs from the user in response to the audiogram test provided to the user. The audio signal or audio context is identified from the plurality of inputs received from the user. Each audio frame or a portion of the audio frame of the audio signal is transformed into frequency domain across a human audible spectrum.

Operation 2: The hearing perception profile of the user is generated using the received one or more user inputs. The hearing perception profile includes the frequency based gain settings for audio playback across different audio frequencies. The hearing perception profile corresponds to the audiogram representative of the personalized audio setting to suit the ambient context of the user. The audiogram is generated using a user interface (UI) to predict the minimum volume at which the user can hear the sound with a particular frequency. The predicted volume is noted in the audiogram.

Operation 3: From the audiogram, a graph illustrating the relationship between the frequency and the gain is generated. The gain is the amount of amplification applied for each frequency. The gain for the specific frequency is applied only for the particular context.

For example, considering that the user is sitting in a coffee shop and listening to songs at 9 kHz input frequency with background noise of people talking. In this case, an initial hearing perception profile of the user is generated and the gain applied for 9 kHz input frequency in the initial hearing perception profile will be 1.2. Table 1 shows the gain applied for different frequencies in the initial hearing perception profile.

TABLE 1

| | Initial hearing perception profile | | | |
|---|---|---|---|---|
| Frequency | 6 kHz | 7 kHz | 8 kHz | 9 kHz |
| Gain | 1.2 | 1 | 1.3 | 1.2 |

The user switches the input audio frequency from 9 kHz to 8 kHz. In such case, the gain applied for 8 kHz input frequency in the initial hearing perception profile will be 1.3 as illustrated in Table 1.

The user makes volume adjustments for 8 kHz input frequency. The contextual compression function management controller (180) generates a final hearing perception profile of the user, and updates the gain for the frequency of 8 kHz for the context of coffee shop to 1.45. Gains for the other frequencies are maintained. Since the user is listening to audio of 8 kHz input frequency and makes volume adjustments for 8 kHz input frequency, the controller (180) updates gain for only 8 kHz input frequency as shown in Table 2. Table 2 shows the gain applied for different frequencies in the final hearing perception profile.

TABLE 2

| | Final hearing perception profile | | | |
|---|---|---|---|---|
| Frequency | 6 kHz | 7 kHz | 8 kHz | 9 kHz |
| Gain | 1.2 | 1 | 1.45 | 1.2 |

In future, if the user is listening to songs at different input frequencies in an ambience similar to the coffee shop context, then the controller (180) identifies the similar context and applies the gain localized for each frequency as per Table 2.

Figure 5:
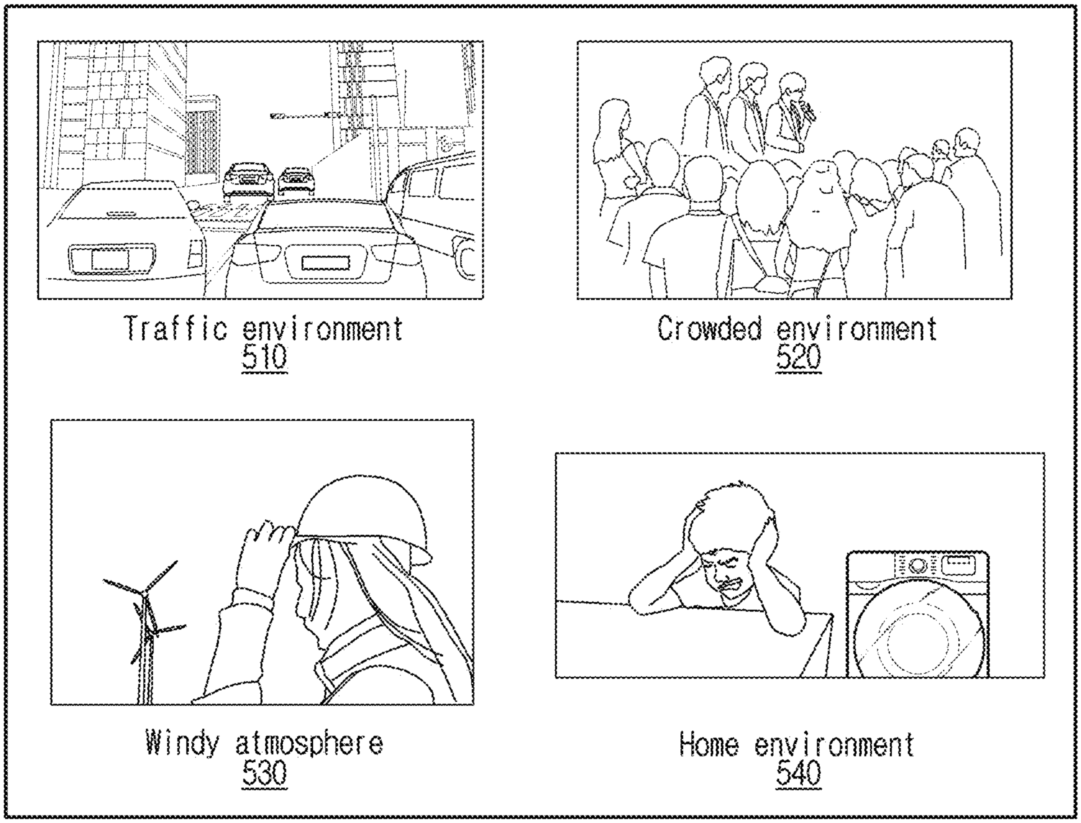
FIG. 5 is a diagram illustrating different example types of environments a user encounters, according to various embodiments.

FIG. 5 is a diagram illustrating an example of different types of the environments the user encounters, according to various embodiments.

Referring to FIG. 5, Generally the hearing perception varies across different environments such as for example but not limited to traffic environment (510), crowded environment (520), windy atmosphere (530), home environment (540), etc. In such cases, it is difficult to perform audiometric test in different environments as we get completely different audiograms which cannot be predicted using one another.

In existing systems, contextual audio enhancement is not intelligent enough to learn dynamically the habits of the user. In case if the system dynamically learns the habits of the user, the system only performs crude speech processing like volume/equalizer settings. Therefore, the system does not give direct fine-grained enhancement across wide range of environments the user encounters on daily basis. However, the disclosed method designs the contextual compression function management controller (180) that has the ability to separately process each frequency fine-tuned to as many environmental settings as possible. Further, the learning module (188) is implemented to learn and heavily personalise the electronic device (100) to the user's hearing ability and habits to achieve personalized audio enhancement.

Figure 6:
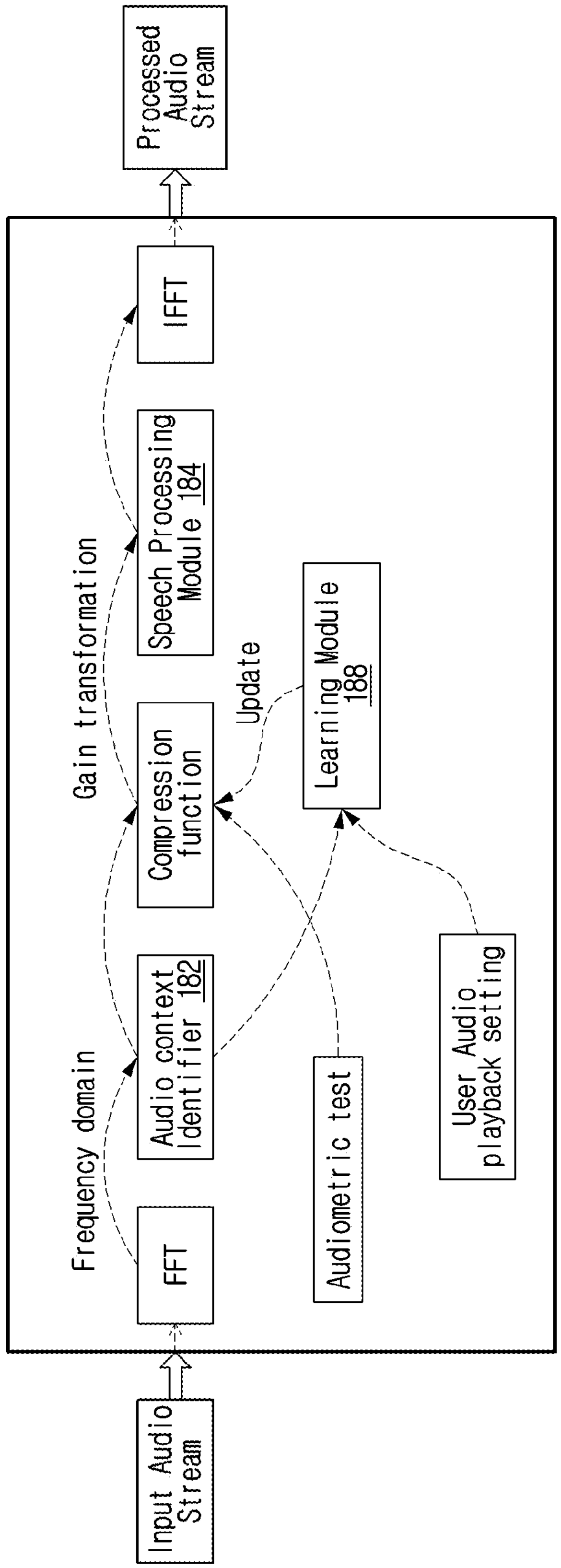
FIG. 6 is a flow diagram illustrating an example process for the personalized audio enhancement, according to various embodiments.

FIG. 6 is a flow diagram illustrating an example process for personalized audio enhancement, according to various embodiments as disclosed herein.

Referring to FIG. 6, the user undergoes the one-time audiometric test to initialize the compression function and generate the initial compression function based on the user inputs. The plurality of inputs is received from the user of the electronic device (100), in response to the audiogram test provided to the user. The input audio frame is converted to frequency domain using the Fast Fourier Transform (FFT), and sent to the context identifier (182) and the speech processing module (184). The context identifier (182) identifies the contextual parameters during audio playback in different ambient conditions. The initial compression function is modified to generate the contextual compression function.

The contextual compression function outputs the gain information which is used to enhance the audio, using the contextual parameter. The learning module (188) operates independently to make a decision using the context and user inputs, and updates the compression function accordingly. The frequency domain is again converted to time domain using the Inverted-FFT to output the enhanced audio.

Figure 7:
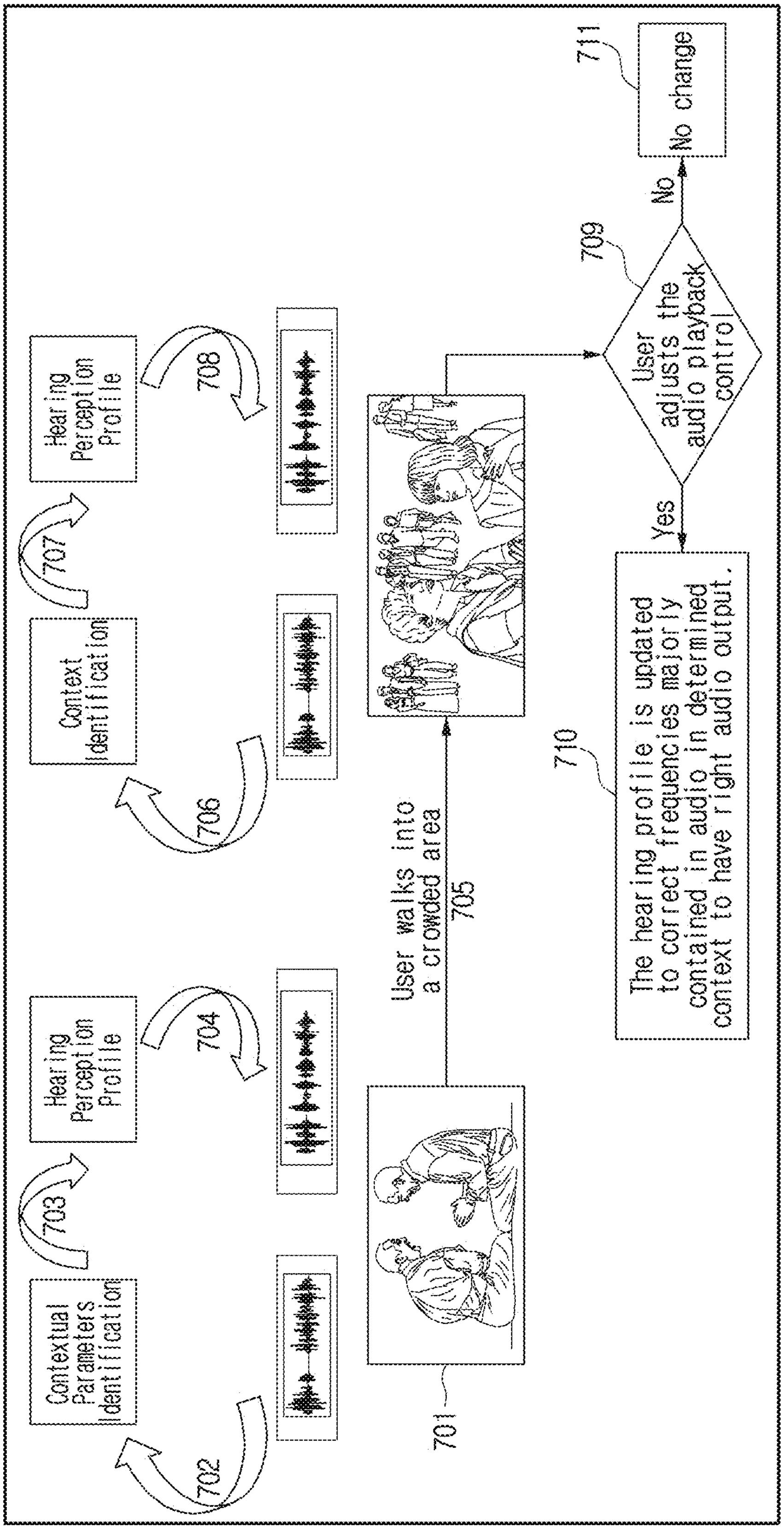
FIG. 7 is a diagram illustrating an example intelligent context aware automatic audio enhancement, according to various embodiments.

FIG. 7 is a diagram illustrating an example of an intelligent context aware automatic audio enhancement, according to various embodiments.

FIG. 7 shows an example illustrating a scenario in which the user has a conversation with his friend while taking a walk. The audio is recorded in a microphone present in the electronic device (100) e.g. the earbuds. The audio is further processed and played to the user. As the user walks through a quiet area, the amplification factor for each frequency is low. Then the user goes into a crowded area. Since the noise is majorly conversational noise in the crowded area, the midrange frequencies which are affected by the conversational noise are enhanced without degrading speech quality in other frequencies.

The process for enhancing the midrange frequencies is described with reference to FIG. 7 by the following operations: At 701, the user is having the conversation with his friend while taking walk in the quite area. At 702, the inputs are received from the user and the contextual parameters are analyzed from the received user inputs. The context identifier (182) identifies that the user is having conversation with low background noise and echo, since the user is having conversation in the quite area. The input audio from the conversation is recorded in the microphone of the electronic device (100). At 703, a first hearing perception profile of the user is generated using the received one or more user inputs. The first hearing perception profile includes the first frequency based gain settings for audio playback across different audio frequencies. At 704, the recorded audio is enhanced at frequency level accordingly, and the enhanced audio is played to the user, according to the first hearing perception profile.

At 705, the user walks into the crowded area from the quiet area. At 706, the inputs are received from the user and the contextual parameters are analyzed from the received user inputs. Since the user is having conversation in the crowded area, the context identifier (182) identifies that the user is having the conversation with high babble and wind noise, in response to the contextual parameters. The input audio from the conversation is recorded in the microphone of the electronic device (100). At 707, a second hearing perception profile of the user is generated using the one or more contextual parameters. The second hearing perception profile includes second frequency based gain settings for audio playback across each of the different audio frequencies. At 708, the recorded audio from the conversation is enhanced with certain frequencies amplified to meet user's requirements, and played back to the user, without degrading the speech quality in other frequencies.

At 709, the contextual compression function management controller (180) determines whether the user adjusts the audio playback settings such as for example but not limited to volume control, the equalizer settings, the normal/ambient sound/active noise cancellation mode, etc., of the audio. At 710, if yes, the second hearing perception profile of the user is updated to correct the frequencies majorly contained in the recorded audio in determined context to have right audio output. Hence, the user doesn't need to do anything manually, if the user has the similar context next time. At 711, if no, there are no changes made to the second hearing perception profile of the user.

Figure 8:
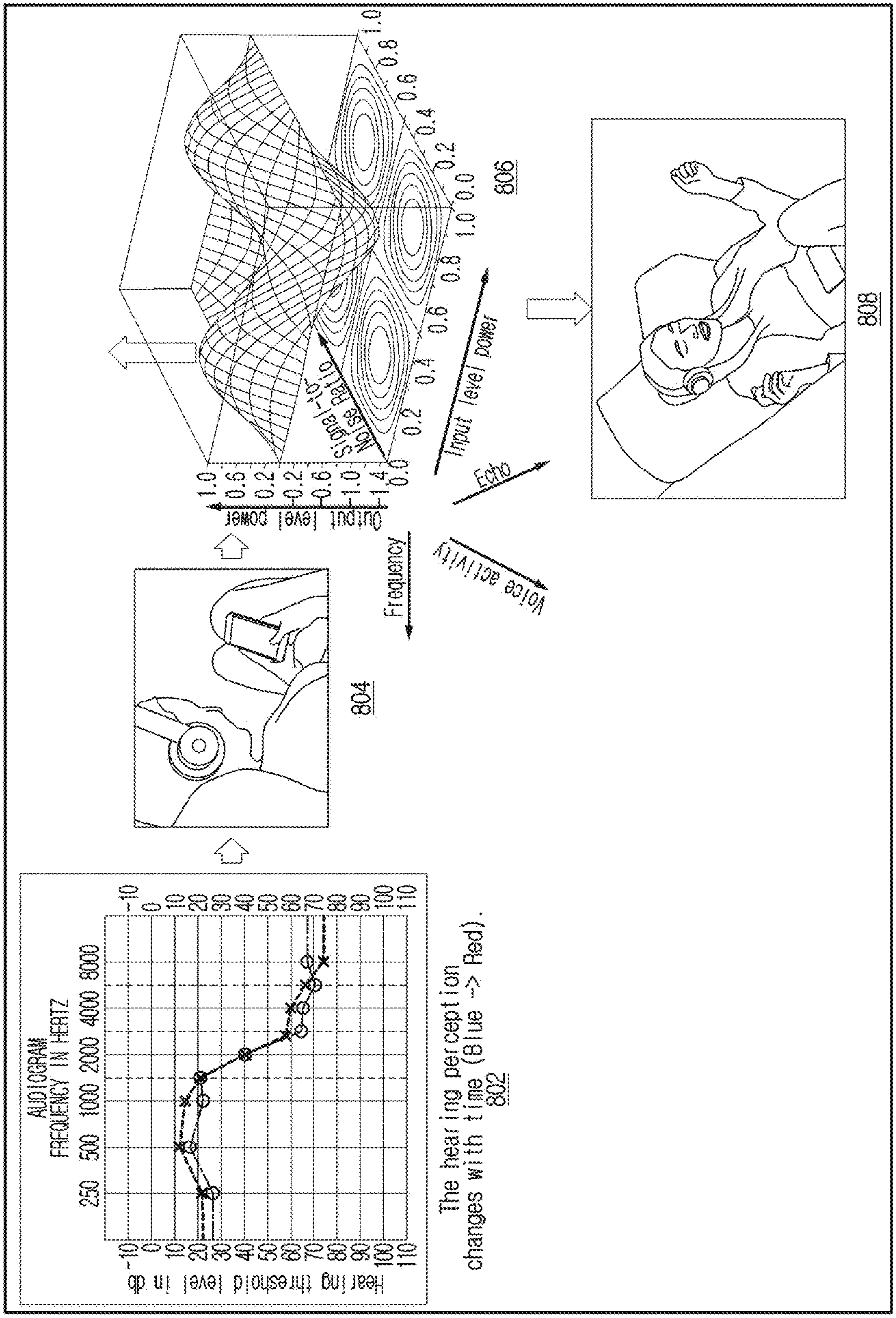
FIG. 8 is a diagram illustrating example personalization to hearing perception of the user, according to various embodiments.

FIG. 8 is an example illustrating the personalization to hearing perception of the user, according to the embodiments as disclosed herein.

FIG. 8 is a diagram illustrating an example scenario in which the user is listening to the songs in home environment. The audiogram (802) illustrating the relationship between the frequency and the hearing threshold level is shown. The hearing perception changes with time for the user and some frequencies degrade more than the other frequencies. In normal cases, the user has to take the hearing profile test repeatedly. But here, the learning module (188) is implemented to learn the contextual compression function continuously in order to adjust the electronic device (100) according to the user's hearing perception. For example, in home environment, the lower frequencies degrade more than the higher frequencies. The user increases (804) volume and bass for audio in the equalizer settings with lower frequencies more often. In such cases the frequencies of the audio will be compensated (806) by increasing the gain in those regions so that the user will not have to control the setting the next time in the home environment.

Figure 9:
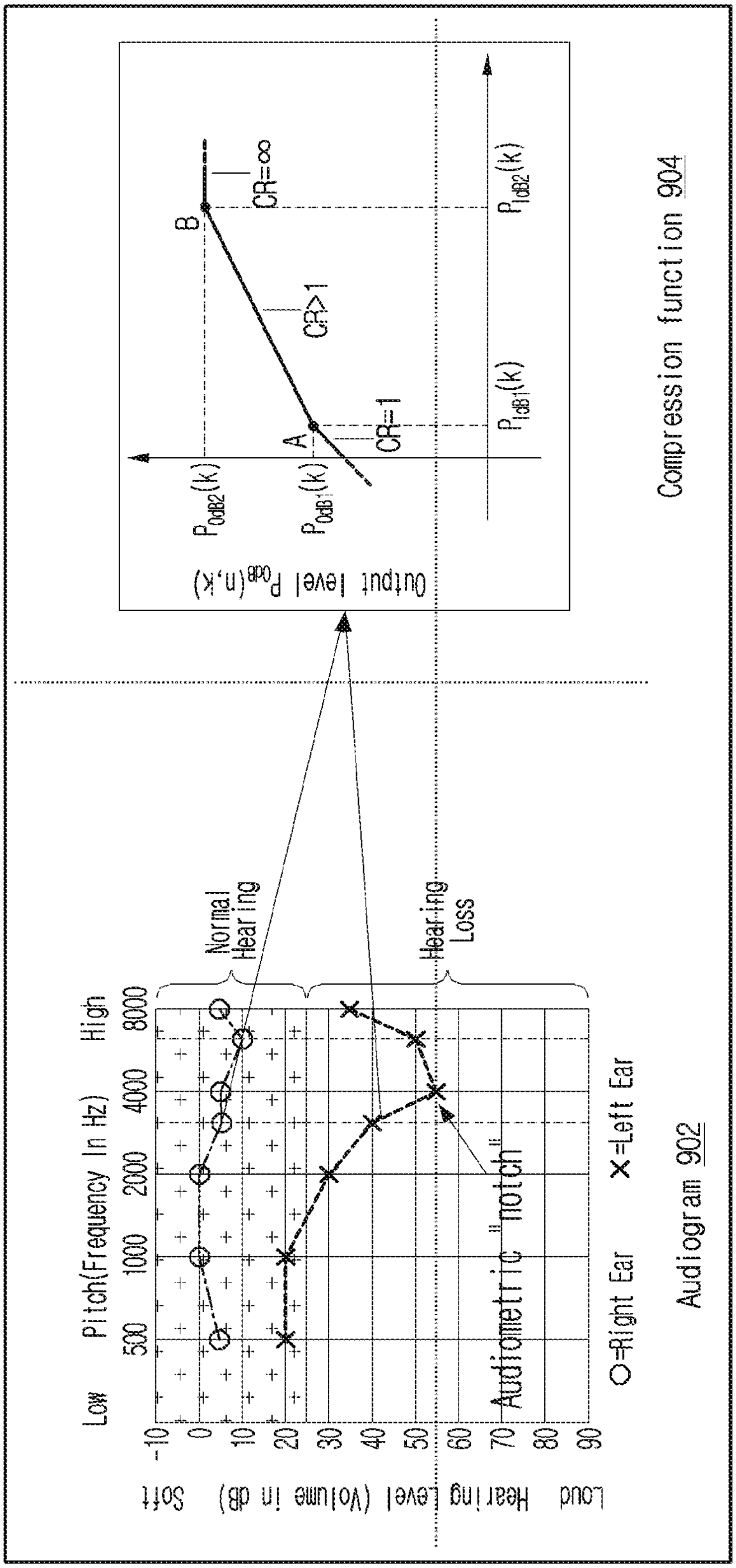
FIG. 9 is a diagram illustrating a relationship between an audiogram and a compression function, according to various embodiments.

FIG. 9 is a diagram illustrating the relationship between the audiogram and the compression function, according to various embodiments.

FIG. 9 shows that for each frequency in the audio, the compression function (904) is generated accordingly using the audiogram (902). The compression function (904) is generated to provide the amplification factor e.g., a mapping between the input of the audio and the output power that needs to be played to the user.

Figure 10:
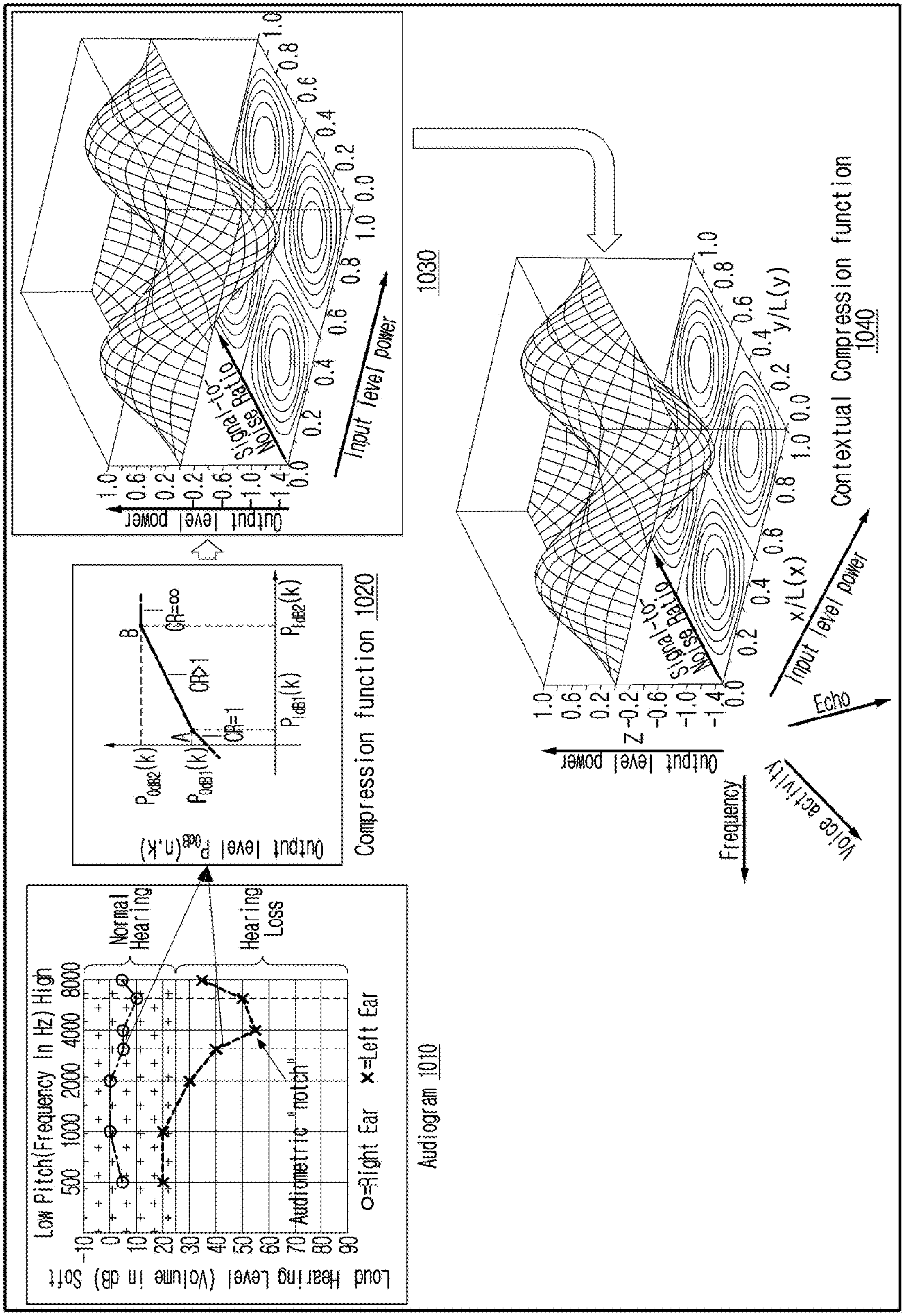
FIG. 10 is a diagram illustrating an example contextual compression function, according to various embodiments.

FIG. 10 is a diagram illustrating an example contextual compression function, according to various embodiments.

FIG. 10 shows that the compression function (1020) is generated accordingly for each frequency in the audio using the audiogram (1010). The compression function (1020) can be expanded in response to the contextual parameters. For example, the one dimensional input compression function (1030) can be expanded to multiple dimensional input compression function (1040) with new dimensions, using the contextual compression function management controller (180). Each new dimension of the multiple dimensional input compression function (1040) represents one of the contextual parameter that is used to represent the environment.

Figure 11:
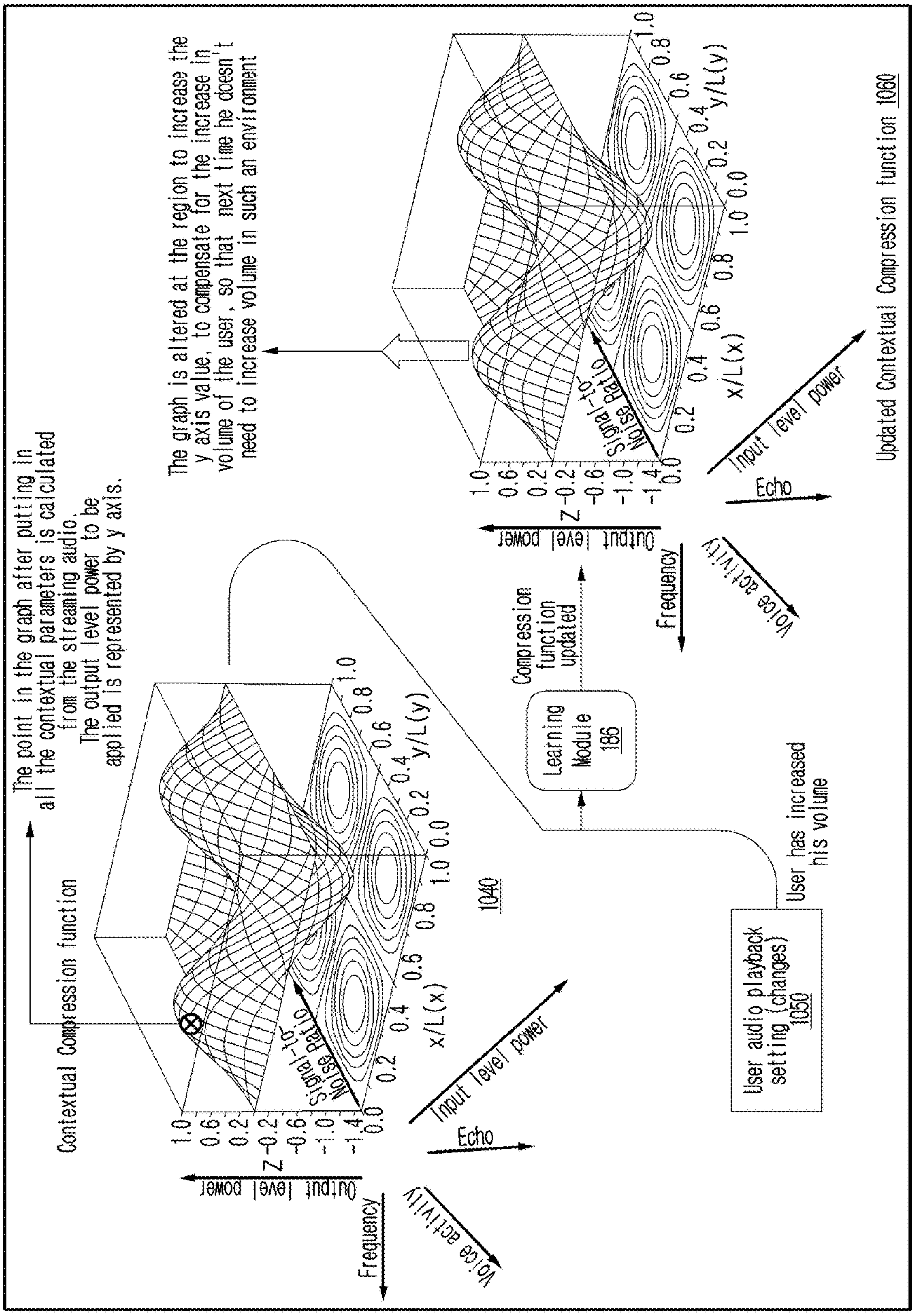
FIG. 11 is a diagram illustrating example dynamic learning of a contextual compression function using a learning module, according to various embodiments.

FIG. 11 is a diagram illustrating an example of dynamic learning of contextual compression function using the learning module (188), according to various embodiments.

FIG. 11 shows that the contextual compression function management controller (180) updates the multiple dimensional contextual compression function (1040) based on the user inputs. Considering a scenario that the user changes (1050) the audio playback settings to increase the volume of the audio say for example in the equalizer settings, the learning module (188) is configured to continuously learn and calculate the contextual parameters from the streaming audio. The learning module (188) is configured to compensate or balance the frequencies for the increase in volume of the audio by itself, so that next time the user doesn't need to increase volume in such an environment. Thereby, updating (1060) the multiple dimensional contextual compression function based on the user inputs.

Consider that the user is on a phone call using the electronic device (100) e.g. an earbuds while walking. He passes from a quite street and enters a crowded area. Hence, the audio stream will be distinctively amplified for speech portions covering the phone call audio frequencies, while the noisy regions will be de-amplified using the contextual compression function management controller (180).

People with hearing loss have trouble with certain frequencies especially in conversational background noise. Consider that the user who has hearing loss impairment is listening to music on his headphone. He goes from a busy street to his home. The enhancement when in a noisy street has to be limited and the de-amplification when he reaches home (no noise) has to be immediate, due to different audio perception of the user with hearing loss impairment compared to the normal person Amplification which is ok for normal person will be painful for hearing loss person. Hence, the contextual factors should be separately considered for each frequency. Therefore, the contextual compression function dynamically learns the user habits and activities and makes the system heavily personalized to the user at frequency level.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method for personalized audio enhancement using an electronic device, the method comprising:

receiving, by the electronic device, a plurality of inputs, in response to an audiogram test;

generating, by the electronic device, a first audiogram corresponding to a one-dimensional frequency-based compression function and representative of a first personalized audio setting to suit a first ambient context, based on the received inputs received;

determining, by the electronic device, a change from the first ambient context to a second ambient context for an audio playback;

analyzing, by the electronic device, a plurality of contextual parameters during the audio playback in the second ambient context;

generating, by the electronic device, a second audiogram corresponding to a multi-dimensional frequency-based compression function and representative of a second personalised audio setting to suit the second ambient context based on the analysis of the plurality of contextual parameters, wherein each dimension of the multi-dimensional frequency-based compression function represents one of the plurality of contextual parameters; and performing amplification control of audio during the audio playback in the second ambient context based on the second audiogram.

2. The method as claimed in claim 1, wherein the first audiogram includes first frequency-based gain settings for audio playback across each of different audio frequencies in the first ambient context.

3. The method as claimed in claim 1, wherein the second audiogram includes second frequency-based gain settings for audio playback across each of different audio frequencies in the second ambient context.

4. The method as claimed in claim 1, wherein the change from the first ambient context to the second ambient context is determined by monitoring a plurality of audio signals with different audio frequencies played back in different ambient conditions.

5. The method as claimed in claim 1, wherein the contextual parameters include at least one of an audio context, a noise context, a signal-to-noise ratio, an echo, a voice activity, a scene classification, a reverberation, or a user input during the audio playback in the second ambient context.

6. An electronic device configured for personalized audio enhancement, wherein the electronic device comprises:
- memory;
- a processor, comprising processing circuitry, coupled to the memory;
- a communicator comprising communication circuitry coupled to the memory and the processor; and
- a contextual compression function management controller, comprising circuitry, coupled to the memory, the processor and the communicator, and configured to:
  - receive a plurality of inputs, in response to an audiogram test;
  - generate a first audiogram corresponding to a one-dimensional frequency-based compression function and representative of a first personalized audio setting to suit a first ambient context, based on the received inputs;
  - determine a change from the first ambient context to a second ambient context for an audio playback;
  - analyze a plurality of contextual parameters during the audio playback in the second ambient context;
  - generate a second audiogram corresponding to a multi-dimensional frequency-based compression function and representative of a second personalised audio setting to suit the second ambient context based on the analysis of the plurality of contextual parameters, wherein each dimension of the multi-dimensional frequency-based compression function represents one of the plurality of contextual parameters; and
  - perform amplification control of audio during the audio playback in the second ambient context based on the second audiogram.

7. The electronic device as claimed in claim 6, wherein the first audiogram includes first frequency based gain settings for audio playback across each of different audio frequencies in the first ambient context.

8. The electronic device as claimed in claim 6, wherein the second audiogram includes second frequency based gain settings for audio playback across each of different audio frequencies in the second ambient context.

9. The electronic device as claimed in claim 6, wherein the change from the first ambient context to the second ambient context is determined by monitoring a plurality of audio signals with different audio frequencies played back in different ambient conditions.

10. The electronic device as claimed in claim 6, wherein the contextual parameters includes at least one of an audio context, a noise context, a signal-to-noise ratio, an echo, a voice activity, a scene classification, a reverberation, or an input during the audio playback in the second ambient context.

11. A method for personalized audio enhancement using an electronic device, wherein the method comprises:
- receiving, by the electronic device, a plurality of inputs, in response to an audiogram test;
- generating, by the electronic device, a first hearing perception profile using the received one or more inputs, the first hearing perception profile corresponding to a first audiogram corresponding to a one-dimensional frequency-based compression function;
- monitoring over time, by the electronic device, audio playback across different audio frequencies in different ambient conditions;
- analyzing, by the electronic device, a plurality of contextual parameters during the audio playback across different frequencies during different ambient conditions;
- generating, by the electronic device, a second hearing perception profile using the plurality of contextual parameters, the second hearing perception profile corresponding to a second audiogram corresponding to a multi-dimensional frequency-based compression function, wherein each dimension of the multi-dimensional frequency-based compression function represents one of the plurality of contextual parameters; and
- perform amplification control of audio during the audio playback based on the second hearing perception profile.

12. The method as claimed in claim 11, wherein the first hearing perception profile includes a first frequency based gain settings for audio playback across different audio frequencies, and the second hearing perception profile includes a second frequency based gain settings for audio playback across each of the different audio frequencies.

* * * * *